United States Patent Office.

A. V. LEE, OF CLAYTON, ALABAMA.

Letters Patent No. 81,181, dated August 18, 1868.

IMPROVED MEDICINE FOR FEVER AND AGUE.

*The Schedule referred to in these Letters Patent and making part of the same.*

TO ALL WHOM IT MAY CONCERN:

Be it known that I, A. V. LEE, of Clayton, in the county of Barbour, and State of Alabama, have invented a new and improved Medical Compound; and I do hereby declare that the following is a full, clear, and exact description thereof, which will enable those skilled in the art to make and use the same.

This invention relates to a combination of ingredients for forming a medicine for the cure of diseases which prevail in almost all climates to a greater or less extent, and which diseases have generally baffled the skill of the medical faculty.

I refer more particularly to bilious diseases, and especially to what is known as fever and ague.

In the course of my experiments, I have satisfied myself, and, in fact, discovered, that the ague and fever can be cured in a very few days (not to exceed ten) as certainly as any other disease.

In carrying out my invention, I form a compound composed of the following ingredients, and in about the proportions named, viz:

For a sufficient quantity of the composition to form sixty pills, of ordinary size, I use ninety grains of quinine, thirty grains of sulphate of iron, thirty grains of phosphate of iron, thirty grains of sulphate of zinc, fifteen grains of peperine, and sixty grains of the extract of gentian.

I claim as new, and desire to secure by Letters Patent—

A medical compound, composed of the above-mentioned ingredients in about the proportions named, substantially as and for the purposes set forth.

A. V. LEE.

Witnesses:
    S. F. LIGHTNER,
    J. D. RUMPLE, Jr.